July 18, 1933. F. E. DOUGLAS 1,919,146
TEMPLE THREAD CUTTER FOR LOOMS
Filed Feb. 9, 1933

WITNESS.
CLINTON S. COBURN.

INVENTOR.
FREDRIC E. DOUGLAS.
BY
ATTORNEY.

Patented July 18, 1933

1,919,146

UNITED STATES PATENT OFFICE

FREDRIC E. DOUGLAS, OF HOPEDALE, MASSACHUSETTS, ASSIGNOR TO DRAPER CORPORATION, OF HOPEDALE, MASSACHUSETTS, A CORPORATION OF MAINE

TEMPLE THREAD CUTTER FOR LOOMS

Application filed February 9, 1933. Serial No. 655,961.

The present invention relates to the thread cutting mechanism of a loom temple, and has more particular reference to the type of such mechanism which includes a stationary ledger blade and a movable cutter blade positioned in a guideway in the temple head.

The principal object of the invention is to provide a temple thread cutting mechanism of the type noted, having means for procuring an improved shearing relation between the ledger blade and the cutting edge of the movable cutter member.

A further object of the invention is to provide a movable cutter blade which may be inserted in existing temples to thereby procure the aforementioned improved shearing relation between the respective blades which constitute the thread cutting mechanism.

Two embodiments of my invention are illustrated on the accompanying drawing, in which.

Figure 2:
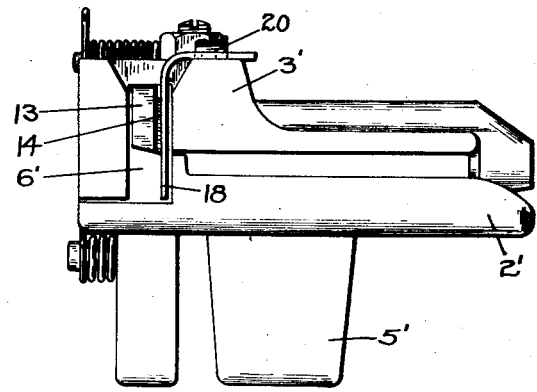
Fig. 2 is a view similar to Fig. 1 but showing the second embodiment.
Figure 3:
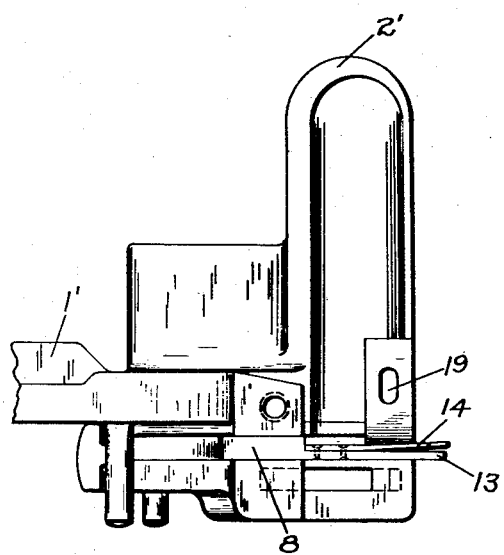
Fig. 3 is a plan view of the temple shown in Fig. 2, but with the cap removed.

The temple shown in Fig. 1 includes a suitable bar 1 by which it is supported, a head comprised of pod 2, cap 3 and a roll or rolls 4, a depending heel 5 by which the temple may be reciprocated, and the thread cutting mechanism to be hereinafter described. The temple shown in Figs. 2 and 3 is similarly constituted, the bar, pod, cap and heel thereof being designated by reference numerals 1', 2', 3' and 5', respectively.

The pod and cap 2, 3 or 2' and 3' are provided with cooperating cut out portions constituting a guideway 6 or 6' which is positioned substantially in a vertical plane and extends longitudinally of the temple head, preferably entirely therethrough. The thread cutting mechanism is positioned in and guided by the guideway.

Figure 1:
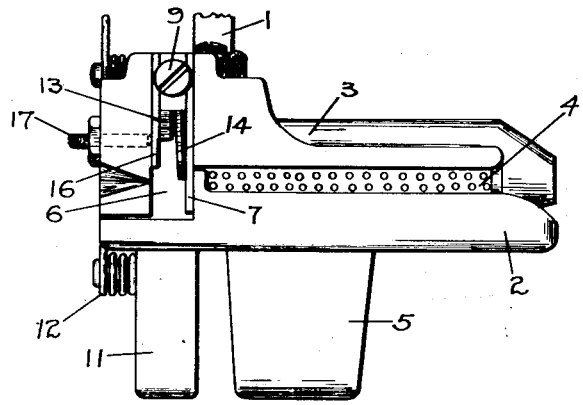
Fig. 1 is a view in elevation of the rear face of a temple embodying one form of my improved thread cutting mechanism.
Figure 4:
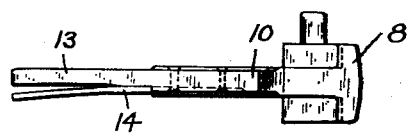
Fig. 4 is a top plan view of the movable cutter blade, which appears in both Figs. 1 and 2.
Figure 5:
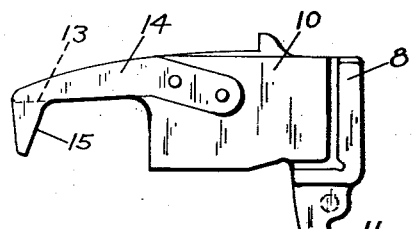
Fig. 5 is a view, in elevation, of the blade shown in Fig. 4.

Referring to Figs. 1, 4 and 5 only, the thread cutting mechanism illustrated therein is comprised of a flat steel ledger blade 7 and a movable cutter blade 8. The ledger blade 7 is positioned vertically in the guideway 6 at one side of the rearward end thereof and extends upwardly into a groove or slot in the temple head where it is secured by the head of a screw 9. A rear, vertical corner on the ledger blade is sharpened, to form a cutting edge.

The movable cutter member 8 is formed, in the main, of a rigid metal body portion 10, which is preferably flat on both sides so as to be positioned in a vertical plane in the guideway. At the forward end of the body portion 10 is a usual form of depending operating portion 11 which is adapted to be struck by the lay (not shown) for causing the blade to first rock, to hook behind the filling, and then slide forwardly past the cutting edge of the ledger blade. The blade 8 is urged toward its normal rearward position by a conventional form of spring 12.

The rearward end of the body portion of the blade 8 is provided with a rearwardly extending finger 13 which forms a backing for the cutting tip 14. The body portion 10, operating portion 11 and backing finger 13 are, in the present instance, cast integrally of brass or cast iron, although they may be otherwise constituted, provided that they are sufficiently strong and rigid.

The cutting tip 14 is formed of a flat piece of steel, and is resilient, for a purpose specified presently. The forward end of the cutting tip contacts the body portion 10 and is secured thereto, as by being riveted in a recess in the face thereof. The cutting tip extends rearwardly alongside the backing finger but the rearward end of the tip, which is provided with a depending cutting portion having a sharpened edge 15 for cooperation with the ledger blade, is biased slightly away from the rearward end of the backing finger. This may conveniently be accomplished by bending the tip intermediate its ends, in the process of manufacture. The cutting tip bears laterally against the ledger blade.

Means are provided for laterally adjusting the relative positions of the movable cutter blade and ledger blade. In Fig. 1 this is accomplished by adjusting the movable blade. As shown, a bendable strip 16 is positioned in the guideway 6 on the opposite side of the movable blade from the ledger blade. An adjusting screw 17 in the end wall of the temple head bears against the strip 16. By turning the adjusting screw, the strip may be bent and the movable cutter blade pushed toward the ledger blade.

The temple shown in Figs. 2 and 3 employs the same movable cutter blade 8, but the ledger blade and adjusting means are different. Therein, the ledger blade 18 is positioned in the guideway as before, but extends upwardly and then laterally over the top of the temple cap and is provided with a slot 19 through which a cap screw 20 extends. Upon loosening the screw the ledger blade may be moved toward or from the movable blade and then clamped in adjusted position. Other adjusting means may readily be devised if so desired.

Regardless of which form of adjustment is employed, i. e. whether adjustment is made by the movable blade or ledger blade, it will be apparent that since the cutting tip is resilient adjustment of the two blades closer together will result in springing the cutting portion of the tip toward the backing finger 13. This, in turn, results in the finger and tip contacting each other throughout a greater proportion of their length, thereby, in effect, decreasing the free length of the tip, and making it bear harder against the ledger blade. The pressure with which the cutting tip contacts the ledger blade may be varied in accordance with the size and nature of the threads to be cut.

A further advantage of the present construction lies in the fact that the slight space between the cutting tip and backing finger renders the mechanism less liable to become jammed if, for some reason, a thread is not cut but is merely drawn in between the two blades, the perfectly rigid blades of the prior art being, in such instances, likely to become locked out of operation by the wedged thread. At the same time, the backing finger 13 effectively prevents undue bending and distortion of the cutting tip, which would otherwise be likely to occur in the event of faulty operation or mistreatment of the thread cutting mechanism.

It is to be understood that the disclosure of the two embodiments of my invention which, at present, I prefer, is not to be construed as a limitation upon the true scope of the invention, which is defined in the appended claims.

I claim:

1. A thread cutting temple for looms, including a temple head having a guideway extending longitudinally thereof, a stationary ledger blade and a movable cutter blade positioned in said guideway, said movable cutter blade being composed of a rigid body portion having a rearwardly extending backing finger and a resilient, steel cutting tip secured to said body portion so as to extend alongside said backing finger, said cutting tip contacting said body portion at its forward end only and being biased away from said backing finger into shearing relation to the said ledger blade, and means for laterally adjusting the relative positions of said ledger blade and movable cutter member to thereby vary the pressure with which said cutting tip contacts said ledger blade.

2. As an article of manufacture, a cutter blade for thread cutting temples, said blade being comprised of a rigid metallic body portion having at its forward end a depending operating portion and at its rearward end a rearwardly extending backing finger positioned substantially in the same vertical plane as said body portion, and a resilient, steel cutting tip having its forward end secured to and in contact with said body portion and having its rearward, cutting end spaced slightly away from the rearward end of said backing finger.

3. As an article of manufacture, a cutter blade for thread cutting temples, said blade being comprised of a rigid metallic body portion having at its forward end a depending operating portion and at its rearward end a rearwardly extending backing finger positioned substantially in the same vertical plane as said body portion, and a resilient, steel cutting tip having its forward end secured to and in contact with said body portion and having at its rearward end a depending cutting portion, said cutting tip being bent slightly intermediate its ends, to thereby bias its rearward end away from the said backing finger.

FREDRIC E. DOUGLAS.